(12) United States Patent
Huang et al.

(10) Patent No.: US 12,537,249 B2
(45) Date of Patent: Jan. 27, 2026

(54) END COVER ASSEMBLY, BATTERY CELL, BATTERY PACK, APPARATUS AND LIQUID-INJECTION METHOD

(71) Applicant: CONTEMPORARY AMPEREX TECHNOLOGY (HONG KONG) LIMITED, Hong Kong (CN)

(72) Inventors: Shoujun Huang, Ningde (CN); Xinxiang Chen, Ningde (CN); Yulian Zheng, Ningde (CN); Peng Wang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 761 days.

(21) Appl. No.: 17/721,384

(22) Filed: Apr. 15, 2022

(65) Prior Publication Data

US 2022/0238945 A1 Jul. 28, 2022

Related U.S. Application Data

(63) Continuation of application No. PCT/CN2021/089810, filed on Apr. 26, 2021.

(30) Foreign Application Priority Data

May 19, 2020 (CN) .......................... 202010426530.8

(51) Int. Cl.
*H01M 50/15* (2021.01)
*H01M 50/186* (2021.01)

(52) U.S. Cl.
CPC ......... *H01M 50/15* (2021.01); *H01M 50/186* (2021.01); *H01M 2220/20* (2013.01)

(58) Field of Classification Search
CPC .. H01M 50/15; H01M 50/183; H01M 50/184; H01M 50/186; H01M 50/188
See application file for complete search history.

(56) References Cited

U.S. PATENT DOCUMENTS 1,758,515 A * 5/1930 Heiermann ............. F16B 21/18
411/517
2009/0075169 A1 * 3/2009 Kim ..................... H01M 50/147
429/185

(Continued)

FOREIGN PATENT DOCUMENTS

CN 102044641 A 5/2011
CN 102270757 A 12/2011

(Continued)

OTHER PUBLICATIONS

English Translation of CN 205645909 U (Year: 2016).*

(Continued)

*Primary Examiner* — Jeffrey T Barton
(74) *Attorney, Agent, or Firm* — East IP P.C.

(57) ABSTRACT

The present application provides an end cover assembly, a battery cell, a battery pack, apparatus and a liquid injection method. The end cover assembly includes an end cover plate, including a through hole for injecting electrolyte and a fixing portion arranged around the through hole; a nail body, including an accommodating portion for receiving the fixing portion. The accommodating portion is in a shape of annular and includes two inner walls arranged to be spaced apart from each other in a radial direction of the accommodating portion, and an inner wall and an outer wall of the fixing portion are respectively pressed against and engaged with the two inner walls of the accommodating portion to seal the through hole.

13 Claims, 10 Drawing Sheets

(56) References Cited

U.S. PATENT DOCUMENTS

2012/0107653 A1* 5/2012 Guen .............. H01M 10/0431
429/72
2021/0234220 A1* 7/2021 Huang ................ H01M 50/15

FOREIGN PATENT DOCUMENTS

| | | | | | |
|---|---|---|---|---|---|
| CN | 202308098 | U | * | 7/2012 | |
| CN | 102738507 | A | | 10/2012 | |
| CN | 102823027 | A | * | 12/2012 | ............ H01G 11/18 |
| CN | 202585544 | U | | 12/2012 | |
| CN | 202797106 | U | | 3/2013 | |
| CN | 204271180 | U | | 4/2015 | |
| CN | 104737330 | A | | 6/2015 | |
| CN | 205645909 | U | * | 10/2016 | |
| CN | 206546862 | U | | 10/2017 | |
| CN | 107359304 | A | * | 11/2017 | ............ H01M 2/365 |
| CN | 108150596 | A | | 6/2018 | |
| CN | 208256801 | U | | 12/2018 | |
| CN | 208674182 | U | | 3/2019 | |
| CN | 209150179 | U | | 7/2019 | |
| CN | 112332044 | A | | 2/2021 | |
| JP | 2005190776 | A | * | 7/2005 | |
| JP | 2011086622 | A | | 4/2011 | |
| JP | 2011253797 | A | | 12/2011 | |
| KR | 1020110043413 | A | | 4/2011 | |
| KR | 1020110132856 | A | | 12/2011 | |

OTHER PUBLICATIONS

English Translation of JP-2005190776-A (Year: 2005).*
Key frames from Fitness Equipment Help, "Using Snap Ring Pliers," Dec. 22, 2015, YouTube (Year: 2015).*
English Translation of CN 107359304 (Year: 2016).*
English Translation of CN-102823027-A (Year: 2011).*
Translation of CN202308098U (Year: 2012).*
The extended European search report for European Application No. 21809126.2, dated Jun. 23, 2023, 7 pages.
The First Office Action for JP Application No. 2022-541653, dated Sep. 4, 2023, 6 pages.
The First Office Action for Chinese Application No. 202010426530.8, dated Jun. 23, 2022, 20 pages.
The Second Office Action for Chinese Application No. 202010426530.8, dated Nov. 11, 2022, 18 pages.
The CN-Rejection Decision for Chinese Application No. 202010426530.8, dated Jan. 18, 2023, 6 pages.
The International search report for PCT Application No. PCT/CN2021/089810, dated Jul. 26, 2021, 13 pages.
The Notice of Allowance for KR Application No. 10-2022-7023192, dated Dec. 6, 2024, 5 page.

* cited by examiner

END COVER ASSEMBLY, BATTERY CELL, BATTERY PACK, APPARATUS AND LIQUID-INJECTION METHOD

CROSS REFERENCE TO RELATED APPLICATION

The present application is a continuation of International Application No. PCT/CN2021/089810, filed on Apr. 26, 2021, which claims priority to Chinese Patent Application No. 202010426530.8, filed on May 19, 2020, titled "END COVER ASSEMBLY, BATTERY CELL, BATTERY PACK, APPARATUS AND LIQUID-INJECTION METHOD", both of which are hereby incorporated by reference in their entireties.

TECHNICAL FIELD

The present application relates to a technical filed of energy storage equipment, and specifically relates to an end cover assembly, a battery cell, a battery pack, apparatus and a liquid-injection method.

BACKGROUND

With the improvement of electric vehicle technology, electric vehicles are getting more and more closely associated with people's lives, and at the same time, electric vehicles have higher and higher requirements for the performance of their energy-providing batteries.

Because a lithium-ion battery cell has extremely high requirements on the sealing of the structure, the electrolyte is not allowed to leak during use, otherwise it will pollute the surrounding air and environment. At the same time, impurities such as vapor and the like are not allowed to enter a battery pack, which reduces the operation life of the battery.

SUMMARY

The embodiments of the present application provides an end cover assembly, a battery cell, a battery pack, apparatus and a liquid injection method, aiming to improve the sealing performance of the end cover assembly.

In an aspect, an end cover assembly for a battery cell is provided by embodiments of the present application. The end cover assembly includes an end cover plate including a through hole for injecting electrolyte and a fixing portion arranged around the through hole, and a nail body including an accommodating portion for receiving the fixing portion. The accommodating portion is in a shape of annular and includes two inner walls arranged to be spaced apart from each other in a radial direction of the accommodating portion, and an inner wall and an outer wall of the fixing portion are respectively pressed against and engaged with the two inner walls of the accommodating portion to seal the through hole.

In some embodiments, the nail body includes a column body for sealing the through hole and a cover cap connected to an end of the column body, the cover cap includes a convex portion arranged around the column body, the convex portion and the column body enclose to form the accommodating portion, the column body is pressed against and engaged with the inner wall of the fixing portion, and the convex portion is pressed against and engaged with the outer wall of the fixing portion.

In some embodiments, the end cover assembly further includes a sealing member, arranged between the nail body and the fixing portion, to realize the nail body pressed against and engaged with the fixing portion. The column body and the convex portion respectively form two side walls of the accommodating portion, and the column body and the convex portion provide the position limitations in two directions to the fixing portion, so that the force exerted to the fixing portion is more balanced, and the sealing performance of the end cover assembly can be improved.

In some embodiments, the end cover assembly further includes the sealing member, arranged between the nail body and the fixing portion, to realize the nail body pressed against and engaged with the fixing portion. By arranging the sealing member, the nail body can be in an interference fit with the fixing portion, and the sealing performance of the end cover assembly can be improved.

In some embodiments, the sealing member includes a first sealing member, arranged to be sleeved between the column body and the inner wall of the fixing portion. By arranging the first sealing member, the column body can be in the interference fit with the fixing portion, and the sealing performance of the end cover assembly can be improved.

In some embodiments, a first accommodating groove is arranged in the inner wall of the fixing portion and/or the column body to locate the first sealing member in the first accommodating groove. The first sealing member may be located in the first accommodating groove, and the position limitation can be provided to the first sealing member through the first accommodating groove, so as to prevent the first sealing member from being misaligned, and ensure the stability of a relative position between the first sealing member and the fixing portion and/or the nail body.

In some embodiments, the sealing member includes a second sealing member, arranged to be sleeved between the outer wall of the fixing portion and the convex portion. By arranging the second sealing member, the convex portion can be in the interference fit with the fixing portion, and the sealing performance of the end cover assembly can be improved.

In some embodiments, a second accommodating groove is arranged in the outer wall of the fixing portion and/or the convex portion to locate the second sealing member in the second accommodating groove. The second sealing member may be located in the second accommodating groove, and the position limitation can be provided to the second sealing member through the second accommodating groove, so as to prevent the second sealing member from being misaligned, and ensure the stability of a relative position between the second sealing member and the fixing portion and/or the nail body.

In some embodiments, the sealing member includes an annular wall portion.

The cross section of the annular wall portion is in a shape of circle; in the case of the annular wall portion with the circular cross-section, the nail body can receive less resistance force when pressed into the through hole, so that it is convenient for assembling.

Or a cross section of the annular wall portion is in a shape of rectangle, so that the sealing member is in face-to-face contact with the fixing portion and/or the nail body. By the face-to-face contact between the sealing member and the fixing portion and/or the nail body, a contact area between the sealing member and the fixing portion and/or the nail body can be increased, and the sealing performance of the end cover assembly can be improved.

In some embodiments, the end cover assembly further includes a locking member. The locking member has an annular structure and is configured to sleeve and lock outside the cover cap, so that the nail body is pressed against and engaged with the fixing portion. By arranging the locking member, a force can be exerted from the outside of the nail body to the nail body and the fixing portion to ensure the tight engagement of the nail body and the fixing portion.

In some embodiments, the fixing portion is arranged to protrude from a surface of the end cover. The nail body is engaged with the fixing portion, and the fixing portion protrudes from the surface of the end cover plate, so that at least part of the nail body is arranged to protrude from the surface of the end cover plate, and it is convenient for disassembling or mounting the nail body.

In some embodiments, a surface of the end cover plate is recessed to form a sinking platform, and the fixing portion is connected to a bottom face of the sinking platform, so that it can ensure the flatness of an outer surface of the end cover plate and reduce the space occupied by the end cover assembly.

In another aspect, a battery cell is provided by embodiments of the present application, including a case, including an opening, and the end cover assembly as described above to sealing the opening.

In another aspect, a battery pack is provided by embodiments of the present application, including the battery cell as described above, and a housing configured to receive the battery cell.

In another aspect, apparatus is provided by the embodiments of the present application, including the battery cell as described above for supplying electrical power.

In another aspect, a liquid injection method to a battery cell is provided by embodiments of the present application, the method including injecting electrolyte through a through hole on an end cover plate in an end cover assembly of the battery cell;

sealing a nail body into a injecting-liquid hole, so that a fixing portion is accommodated in an annular accommodating portion of the nail body, and an inner wall and an outer side wall of the fixing portion are pressed against and engaged with inner wall of the accommodating portion.

In the end cover assembly in the embodiments of the present application, the end cover assembly includes the end cover plate and the nail body, a through hole is formed in the end cover plate, and the nail body is configured to seal the through hole. The fixing portion is arranged at an outer periphery of the through hole, and the nail body is engaged with the fixing portion and an inner wall of the through hole to increase the contact area between the nail body and the end cover plate, thereby improving the sealing effect. In addition, the nail body includes the annular accommodating portion, and two inner walls of the annular accommodating portion can be pressed against and engaged with the inner wall and the outer wall of the fixing portion. The annular accommodating portion can provide the position limitations in two directions to the fixing portion, so that the force exerted to the fixing portion is balanced, not only can prevent the fixing portion from obliquely deforming, but also can increase the contact area between the nail body and the fixing portion to improve the sealing effect.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

REFERENCE SIGNS 1 battery pack; 11 battery module; 12 housing; 2 vehicle main body;
10 battery cell; 20 receiving portion;
100 end cover assembly;
110 end cover plate; 111 through hole; 112 fixing portion; 113 sinking platform; 113a-bottom face;
120 nail body; 121 column body; 122 cover cap; 123 convex portion;
130 sealing member; 130a first sealing member; 130b second sealing member; 131-annular wall portion;
140 locking member; 141 wall portion; 142 notch; 143 connecting portion;
200 case;
300 electrode assembly.

DETAILED DESCRIPTION

The features and exemplary embodiments of various aspects of the present application will be described in detail below. In the following detailed description, many specific details are proposed in order to provide a comprehensive understanding of the present application. However, it is obvious to those skilled in the art that the present application can be implemented without some of these specific details. The following description of the embodiments is merely to provide a better understanding of the present application by showing examples of the present application. In the drawings and the following description, at least part of the well-known structures and technologies are not shown in order to avoid unnecessary ambiguity to the present application; and, for clarity, the size of some structures may be exaggerated. In addition, the features, structures or characteristics described below may be combined in one or more embodiments in any suitable manner.

In the description of the present application, it should be noted that, unless otherwise specified, "plurality" means more than two; the terms "upper", "lower", "left", "right", "inner", "outer", etc. indicate the orientation or positional relationship only for the convenience of describing the present application and simplifying the description, rather than indicating or implying that the device or the element referred to must have a specific orientation, be configured and operated in a specific orientation, and therefore cannot be understood as a limitation of the present application. In addition, the terms "first", "second", etc. are only used for descriptive purposes, and cannot be understood as indicating or implying relative importance.

The orientation words appearing in the following description are all directions shown in the drawings, and do not limit the specific structure of the present application. In the description of the present application, it should also be noted that, unless otherwise clearly specified and limited, the terms "mount" and "connect" should be understood in a broad sense, for example, it can be a fixed connection, a detachable connection, or an integral connection, it can be a direct connection, or it can be connected indirectly through an intermediary. For those of ordinary skill in the art, the specific meaning of the above-mentioned terms in the present application can be understood according to specific situations.

At present, in order to realize a secondary liquid injection of some lithium-ion batteries, a sealing member usually seals a liquid injection port by means of plugging and unplugging. Lithium ions may generate gas during the operation process, so that it may deform a case of a lithium-ion battery. The liquid injection port is flush with other portions of the case, a portion of the case corresponding to the liquid injection port has a large deformation, and the sealing member may be displaced with the deformation of the case, which may eventually lead to the failure of the sealing of the liquid injection port.

In order to solve the above problems, the present application is provided.

In order to better understand the present application, an electrically connecting assembly and a battery module set of the embodiments of the present application will be described in detail below with reference to FIGS. 1 to 20.

Figure 1:
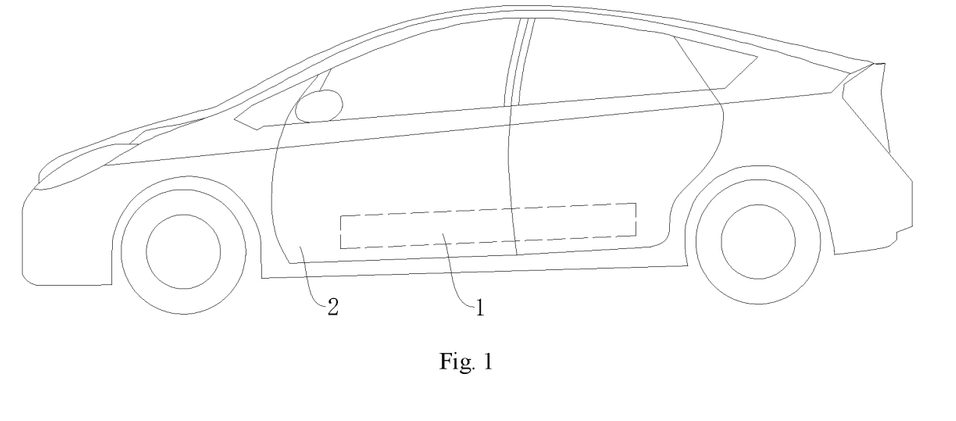
FIG. 1 shows a structural schematic view of a vehicle according to the embodiments of the present application.

Referring to FIG. 1, FIG. 1 shows a structural schematic view of a vehicle according to the embodiments of the present application. As shown in FIG. 1, the vehicle includes a battery pack 1 and a vehicle main body 2, and the battery pack 1 is provided in the vehicle main body 2.

The vehicle is a new energy vehicle, which can be a pure electric vehicle, a hybrid vehicle or an extended-range vehicle. The vehicle main body 2 is provided with a driving motor, electrically connected to the battery pack 1, and the battery pack 1 can supply electric power. The driving motor is connected to wheels on the vehicle main body 2 through a transmission mechanism to drive the vehicle move forward. In some embodiments, the battery pack 1 may be horizontally arranged in the bottom of the vehicle main body 2.

Figure 2:
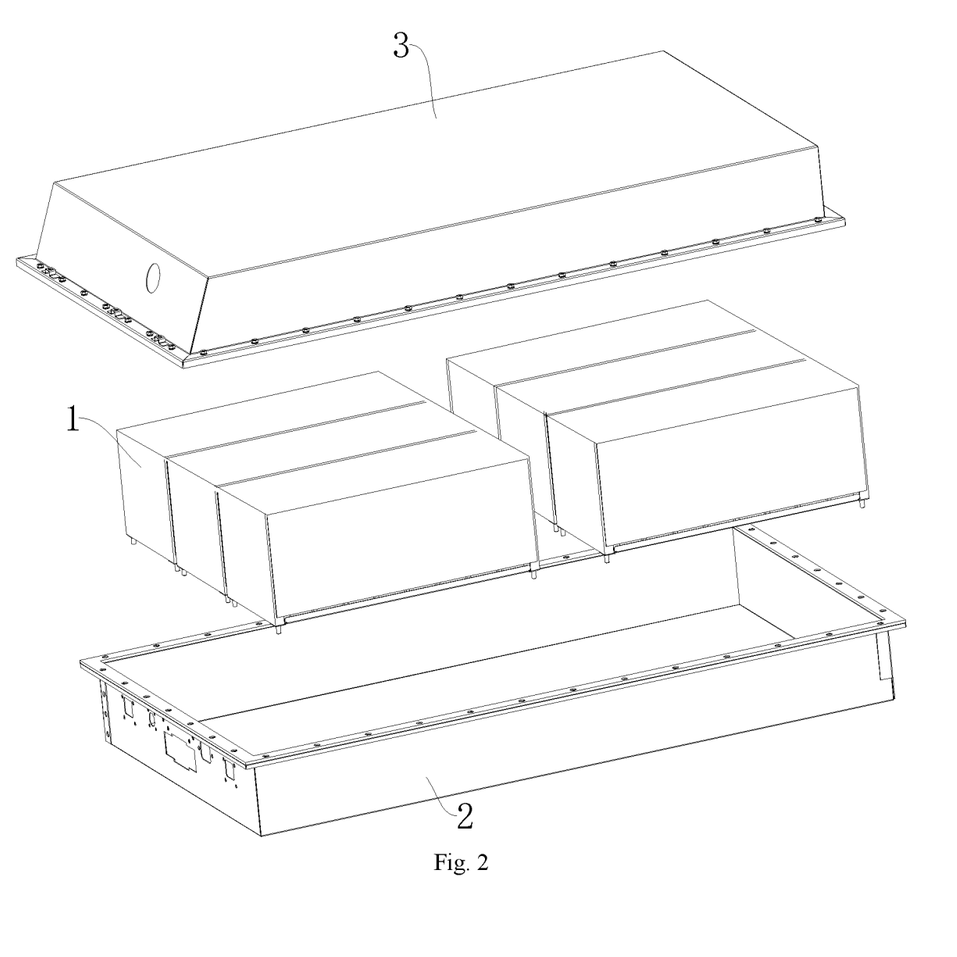
FIG. 2 shows a structural schematic view of a battery pack according to an embodiment of the present application.

Referring to FIG. 2, FIG. 2 shows a structural schematic view of the battery pack 1 according to the embodiments of the present application. In some embodiments, the battery pack 1 includes a housing 12 and a battery module 11 arranged in the housing 12.

The number of the battery module 11 may be one or more. When there are a plurality of battery modules 11, the plurality of battery modules 11 are arranged in array in the housing 12. There are many types of the housing 12, and the housing 12 may be a frame-shaped housing, a disk-shaped housing or a box-shaped housing. Specifically, the housing 12 may include a lower housing for accommodating the battery module and an upper housing covered and closed with the lower housing.

Figure 3:
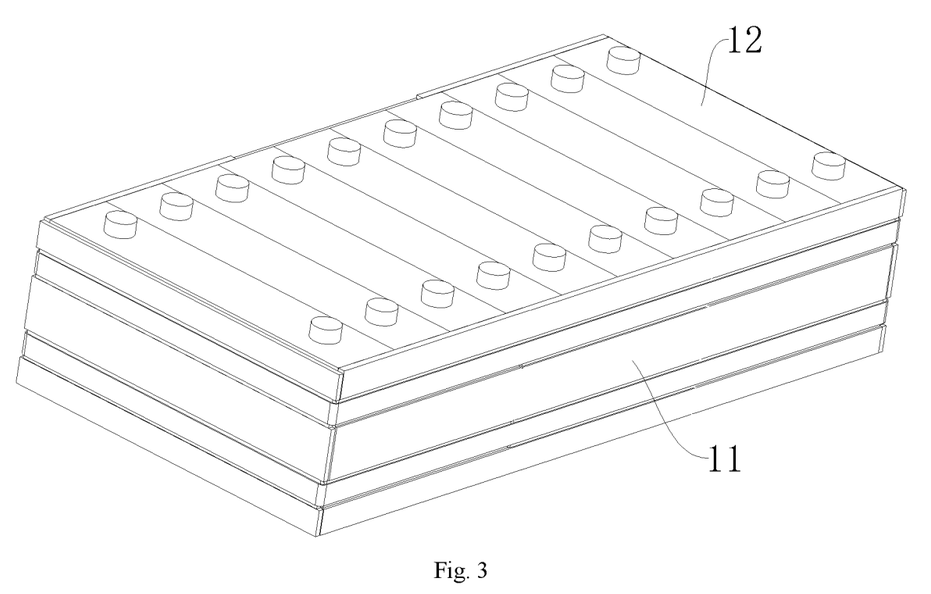
FIG. 3 shows a structural schematic view of a battery module according to an embodiment of the present application.

Referring to FIG. 3, FIG. 3 shows a structural schematic view of the battery module 11 according to the embodiments of the present application. There are many ways to arrange the battery module 11. In some embodiments, the battery module 11 includes a receiving portion 20 and a plurality of battery cells 10 located in the receiving portion 20, and the plurality of battery cells 10 are arranged side by side in the receiving portion 20.

There are many ways to arrange the receiving portion 20, for example, the receiving portion 20 includes a case and a cover plate arranged at the case; or the receiving portion 20 includes side plates and end plates that are successively connected with one another to enclose; or the receiving portion 20 includes end plates arranged opposite each other and a band surrounding the end plates and the battery cells; or, as shown in FIG. 3, the receiving portion 20 includes side plates, end plates and a band.

The battery cell 10 can be used not only in the vehicle but also in other apparatus. The embodiment of the present application also provides apparatus that uses the battery cell 10 as a power source. The apparatus can be, but is not limited to, a vehicle, a ship, an aircraft or the like.

Figure 4:
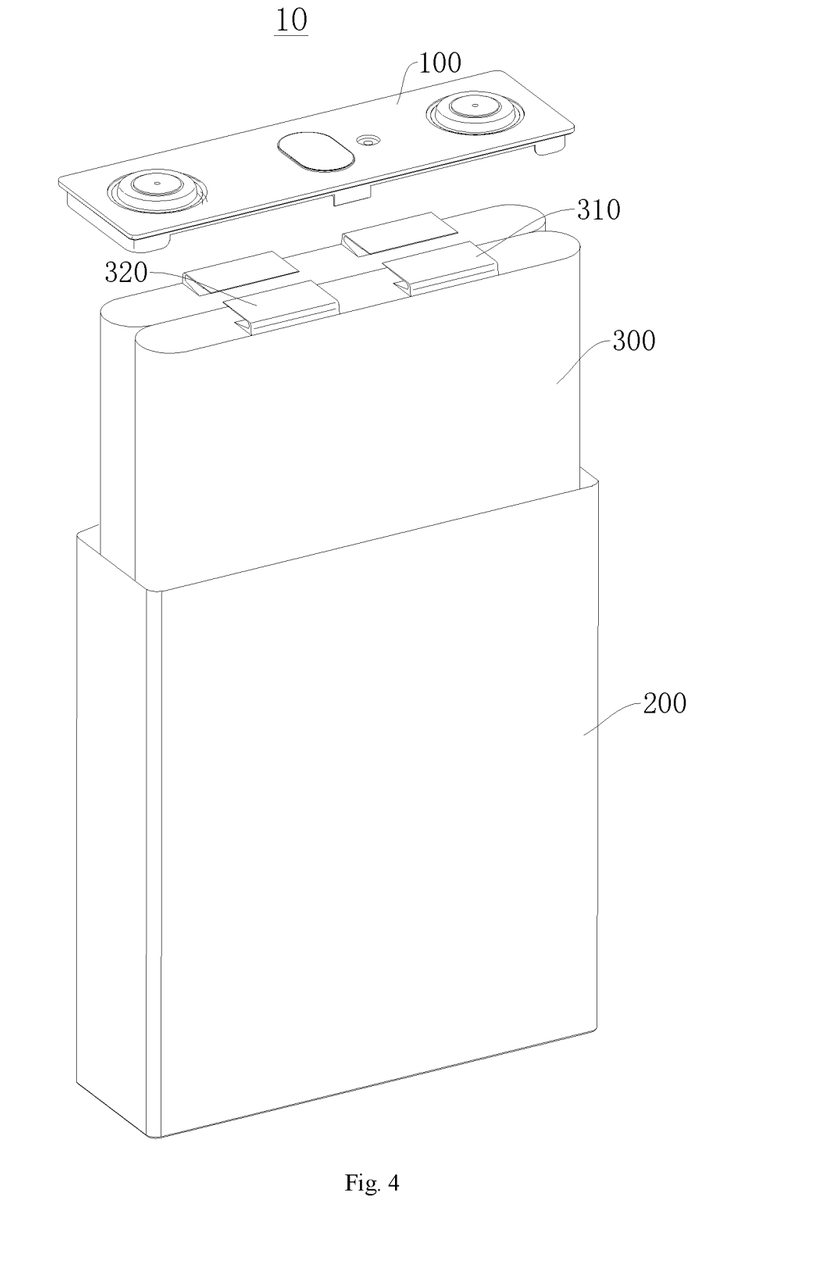
FIG. 4 shows a structural schematic view of a battery cell according to an embodiment of the present application.

Referring to FIG. 4, FIG. 4 shows a structural schematic view of the battery cell 10 according to an embodiment of the present application.

As shown in FIG. 4, in some embodiments, the battery cell 10 includes a case 200 including an opening, and an end cover assembly 100 arranged to cover the case 200. An electrode assembly 300 is also arranged in the case 200 of the battery cell 10.

In some embodiments, the case 200 is provided with electrolyte inside, and the end cover assembly 100 is provided with a through hole 111 used as a liquid injection port and a nail body 120 for sealing the through hole 111. The electrolyte can be injected into the case 200 through the through hole 111, and the through hole 111 can be sealed through the nail body 120.

Figure 5:
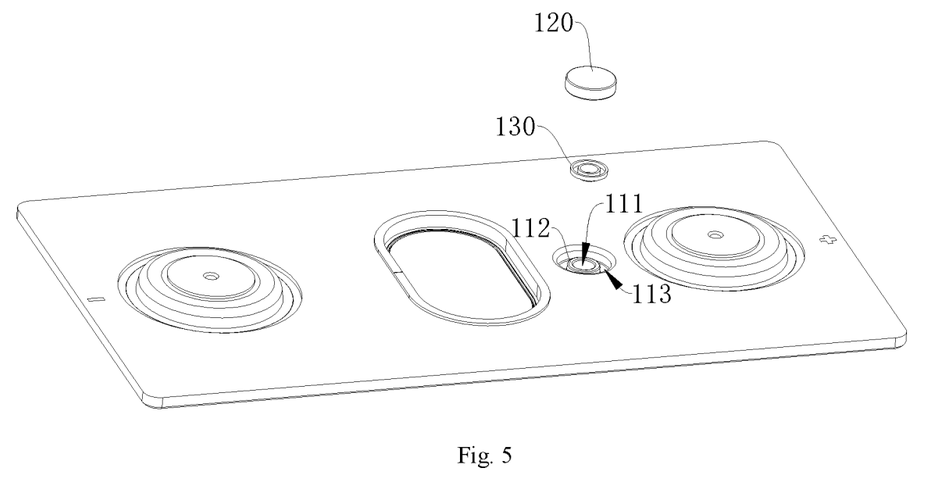
FIG. 5 shows a perspective view of an end cover assembly according to an embodiment of the present application.
Figure 6:
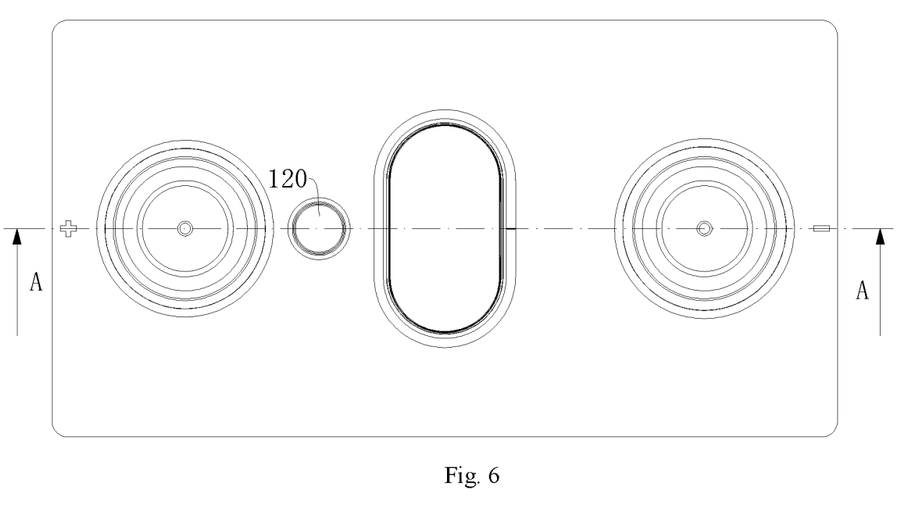
FIG. 6 shows a top view of an end cover assembly according to an embodiment of the present application.
Figure 7:
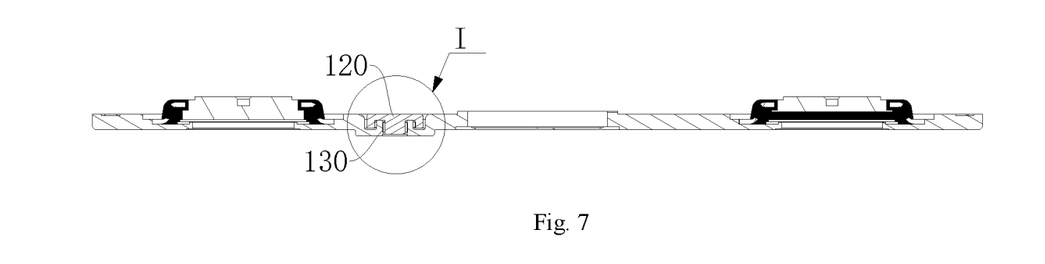
FIG. 7 shows a cross-sectional view at a line A-A in FIG. 6.

Referring to FIG. 5 to FIG. 7 together, FIG. 5 shows a perspective view of the end cover assembly 100 according to an embodiment of the present application, FIG. 6 shows a top view of the end cover assembly 100 according to an embodiment of the present application, and FIG. 7 shows a cross-sectional view at a line A-A in FIG. 6.

The end cover assembly 100 according to the embodiments of the present application includes an end cover plate 110 including the through hole 111 for injecting electrolyte and a fixing portion 112 arranged around the through hole 111, and the nail body 120 including an accommodating portion for receiving the fixing portion 112. The accommodating portion is in a shape of an annular and includes two inner walls arranged to be spaced apart from each other in a radial direction of the accommodating portion, and an inner wall and an outer wall of the fixing portion 112 are respectively pressed against and engaged with the two inner walls of the nail body 120 to seal the through hole 111.

The above-mentioned end cover assembly 100 can not only be used in the battery cell 10 to arrange to cover the opening of the case 200 of the battery cell 10, but also can be arranged to cover openings of other apparatus.

The inner wall of the fixing portion 112 refers to an inner wall face of the fixing portion 112 facing toward the through hole 111, and the outer wall of the fixing portion 112 refers to an outer wall face of the fixing portion 112 away from the through hole 111. The accommodating portion includes an accommodating space for receiving the fixing portion 112, and the inner walls of the accommodating portion refers to inner wall faces of the accommodating portion facing toward the accommodating space.

In the end cover assembly 100 of the embodiments of the present application, the end cover assembly 100 includes the end cover plate 110 and the nail body 120, the through hole 111 is formed in the end cover plate 110, and the nail body 120 is configured to seal the through hole 111. The fixing portion 112 is arranged at an outer periphery of the through hole 111, and the nail body 120 is engaged with the fixing portion 112 and the inner wall of the through hole 111 to increase a contact area between the nail body 120 and the end cover plate 110, thereby improving the sealing effect. At the same time, the fixing portion 112 is arranged around the through hole 111 and protrudes relative to other portions of the end cover plate 110. The deformation of the fixing portion 112 transmitted from the deformation of the end cover plate 110 is less, so that it can reduce the impact of the deformation of the end cover plate 110 of the battery cell 10 on a sealing interface, thereby further improving the sealing effect. In addition, the nail body 120 includes the annular accommodating portion, and two inner walls of the annular accommodating portion can be pressed against and engaged with the inner wall and the outer wall of the fixing portion 112. The annular accommodating portion can provide the position limitations in two directions to the fixing portion 112, so that the force exerted to the fixing portion is balanced. In this way, not only can the fixing portion 112 be prevented from obliquely deforming, but also the contact area between the nail body 120 and the fixing portion 112 can be increased, so that the displacement of the nail body 120 along with the deformation of the end cover plate 110 can be avoided, and the sealing effect can be improved.

In the end cover assembly 100 in the embodiments of the present application, the battery cell 10 may generate gas during an operation process, so that the end cover assembly 100 may be convexly deformed. Since the fixing portion 112 is arranged around the through hole 111, a mating distance between the nail body 120 and the end cover plate 110 in a thickness direction thereof can be increased. When the end cover assembly 100 is convexly deformed, a transmitting distance of the deformation can be increased, so that it may be difficult for the deformation to be transmitted to the fixing portion 112, thereby ensuring the tight engagement of the nail body 120 and the fixing portion 112.

In the embodiment of the present application, since the nail body 120 and the through hole 111 of the end cover assembly 100 are closely engaged with each other, the nail body 120 can be engaged with the through hole 111 and the fixing portion 112 by interference fit, so that the nail body 120 is detachably arranged on the end cover plate 110. During the operation of the battery cell 10, in the case that the electrolyte decreases as the number of charging and discharging of the battery cell 10 increases, the nail body 120 can be removed to facilitate the secondary liquid injection of the battery cell 10.

Figure 8:
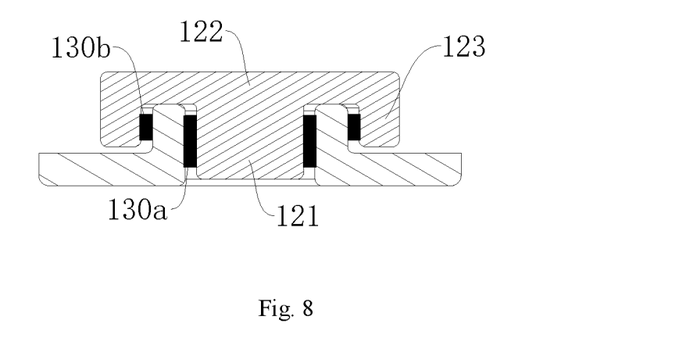
FIG. 8 shows an enlarged schematic view of a portion I in FIG. 7 according to an embodiment of the present application.
Figure 9:
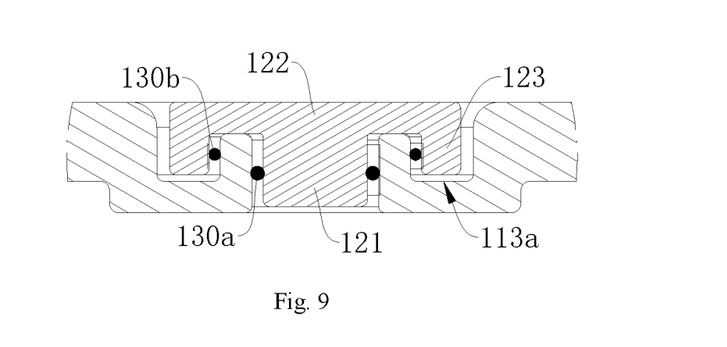
FIG. 9 shows an enlarged schematic view of a portion I in FIG. 7 according to another embodiment of the present application.

Referring to FIG. 8 and FIG. 9 together, FIG. 8 shows an enlarged schematic view of a portion I in FIG. 7 according to an embodiment of the present application, and FIG. 9 shows an enlarged schematic view of a portion I in FIG. 7 according to another embodiment of the present application.

As shown in FIG. 8, there are many ways to arrange the fixing portion 112, and the fixing portion 112 can be arranged to be directly protruded from a surface of the end cover plate 110. In these embodiments, the fixing portion 112 protrudes from the surface of the end cover plate 110, and the nail body 120 is engaged with the fixing portion 112, so that at least part of the nail body 120 is arranged to protrude from the surface of the end cover plate 110, thereby facilitating the action of the removal or the installation of the nail body 120.

As shown in FIG. 9, in other embodiments, the surface of the end cover plate 110 is recessed to form a sinking platform 113, and the fixing portion 112 is connected to a bottom face 113a of the sinking platform 113. In these embodiments, the fixing portion 112 is located in the sinking platform 113, so that it can ensure the flatness of an outer surface of the end cover plate 110 and reduce the space occupied by the end cover assembly 100.

In some embodiments, when the nail body 120 seals in the through hole 111, the nail body 120 is located in the sinking platform 113, so that it can reduce the space occupied by the end cover assembly 100.

There are many materials for the nail body 120. In some embodiments, the material of the nail body 120 includes one of steel, aluminum or other hard metal materials, or the material of the nail body 120 includes the engineering plastics or the like.

There are many ways to arrange the nail body 120. In some embodiments, the nail body 120 includes a column body 121 and a cover cap 122 connected to an end of the column body. The column body 121 is used to seal the through hole 111. The cover cap 122 includes a convex portion 123 arranged around the column body 121, so that the annular accommodating portion is formed between the convex portion 123 and the column body 121. The column body 121 is pressed against and engaged with the inner wall of the fixing portion 112, and the convex portion 123 is pressed against and engaged with the outer wall of the fixing portion 112.

In these embodiments, the column body 121 and the convex portion 123 respectively form two inner walls of the accommodating portion, and the column body 121 and the convex portion 123 provide the position limitations in two directions to the fixing portion 112, so that the force exerted to the fixing portion 112 can be more balanced, and the sealing performance of the end cover assembly 100 can be improved.

In some embodiments, in order to further improve the sealing performance of the end cover assembly 100, the end cover assembly 100 further includes a sealing member 130, arranged between the nail body 120 and the fixing portion 112, to realize the nail body 120 pressed against and engaged with the fixing portion 112.

In these embodiments, by arranging the sealing member 130, the nail body 120 can be in an interference fit with the fixing portion 112, and the sealing performance of the end cover assembly 100 can be improved.

There are many ways to arrange the sealing member 130. In some embodiments, the sealing member 130 includes a first sealing member 130a arranged to be sleeved between the column body 121 and the inner wall of the fixing portion 112, so that the column body 121 can be closely engaged with the fixing portion 112. By arranging the first sealing member 130a, the column body 121 can be in the interference fit with the fixing portion 112, and the sealing performance of the end cover assembly 100 can be improved.

In some embodiments, a first accommodating groove (not shown) is arranged in the fixing portion 112 and/or the column body 121 to locate the first sealing member 130a in the first accommodating groove. In these embodiments, the first sealing member 130a may be located in the first accommodating groove, and the position limitation can be provided to the first sealing member 130a through the first accommodating groove, so as to prevent the first sealing member 130a from being misaligned, and ensure the stability of a relative position between the first sealing member 130a and the fixing portion 112 and/or the nail body 120.

In other embodiments, the sealing member 130 further includes a second sealing member 130b arranged to be sleeved between the outer wall of the fixing portion 112 and the convex portion 123, so that the convex portion 123 can be closely engaged with the fixing portion 112. By arranging the two sealing members 130, the convex portion 123 can be in the interference fit with the fixing portion 112, and the sealing performance of the end cover assembly 100 can be improved.

In some embodiments, a second accommodating groove (not shown) is arranged in the fixing portion 112 and/or the convex portion 123 to locate the second sealing member 130b in the second accommodating groove. In these embodiments, the second sealing member 130b may be located in the second accommodating groove, and the position limitation can be provided to the second sealing member 130b through the second accommodating groove, so as to prevent the second sealing member 130b from being misaligned, and ensure the stability of a relative position between the second sealing member 130b and the fixing portion 112 and/or the nail body 120.

In another embodiments, the sealing member 130 includes the first sealing member 130a and the second sealing member 130b, so that the column body 121 can be closely engaged with the fixing portion 112, the convex portion 123 also can be closely engaged with the fixing portion 112, the balance of the force exerted to the fixing portion 112 can be ensured, and the sealing performance of the end cover assembly 100 can be improved.

The shape of the sealing member 130 is not limited. Referring to FIG. 9 continuously, in some embodiments, the sealing member 130 includes an annular wall portion 131, a cross section of the annular wall portion is in a shape of circle. The cross section of the annular wall portion 131 is a face perpendicular to a radial direction of the sealing member 130. In these embodiments, because of the annular wall portion 131 with the circular cross-section, the nail body 120 receives less resistance force when pressed into the through hole 111, so that the assembly is convenient.

Figure 10:
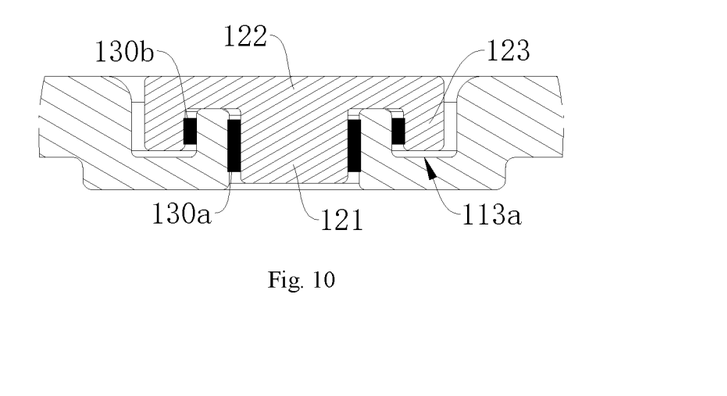
FIG. 10 shows an enlarged schematic view of a portion I in FIG. 7 according to another embodiment of the present application.
Figure 11:
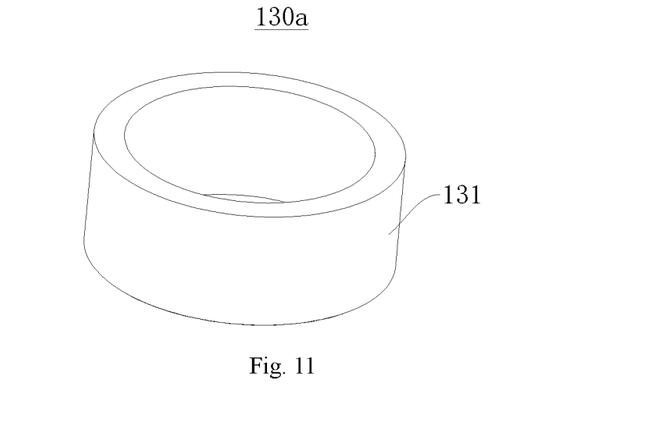
FIG. 11 is a structural schematic view of a first sealing member of an end cover assembly according to an embodiment of the present application.
Figure 12:
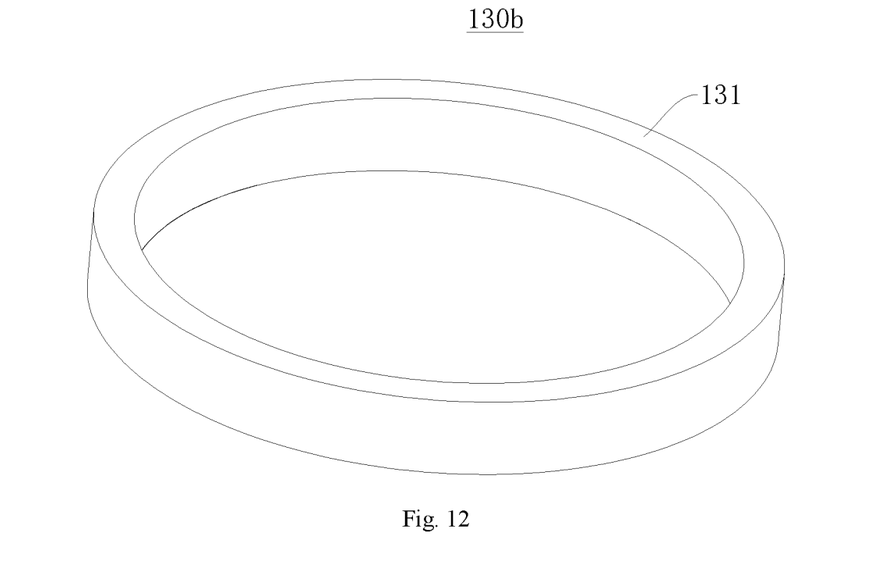
FIG. 12 is a structural schematic view of a second sealing member of an end cover assembly according to an embodiment of the present application.
Figure 13:
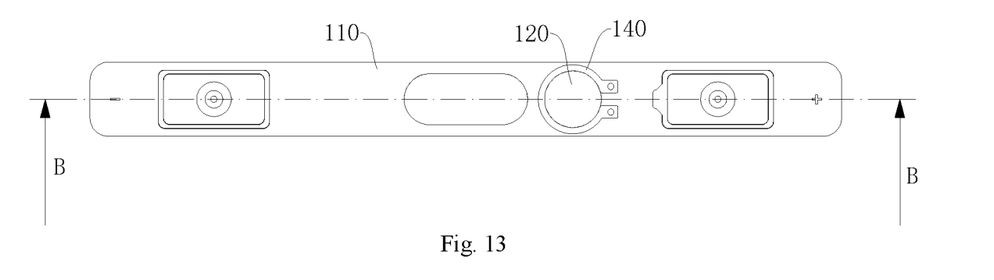
FIG. 13 shows a top view of an end cover assembly according to another embodiment of the present application.
Figure 14:
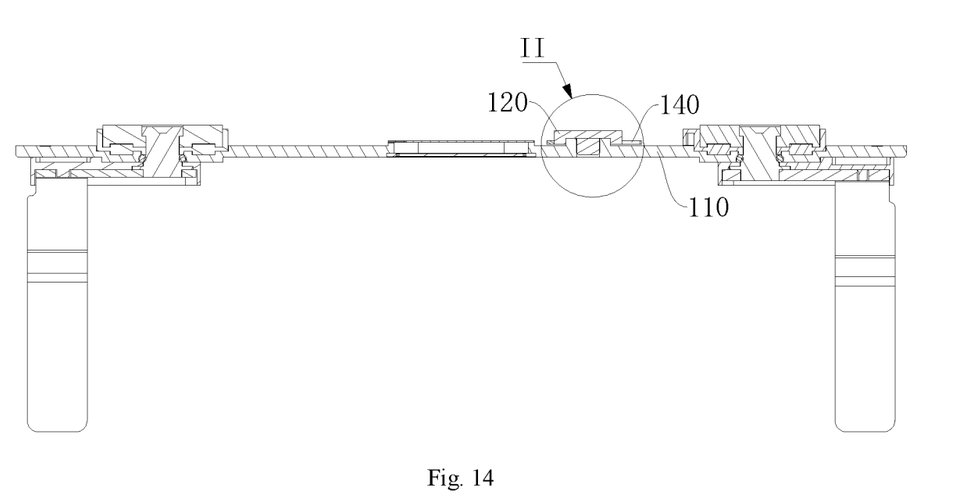
FIG. 14 shows a cross-sectional view at a line B-B in FIG. 13.
Figure 15:
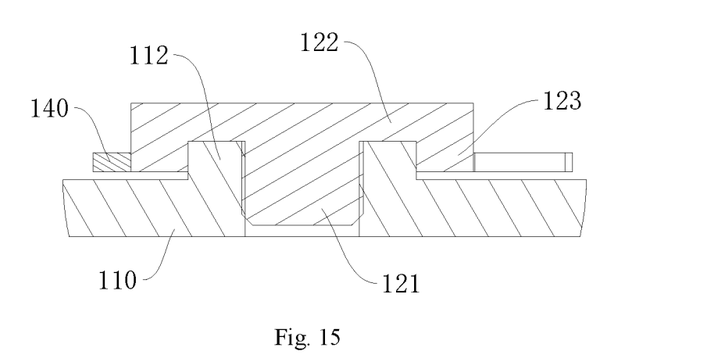
FIG. 15 shows an enlarged schematic view of a portion II in FIG. 14.
Figure 16:
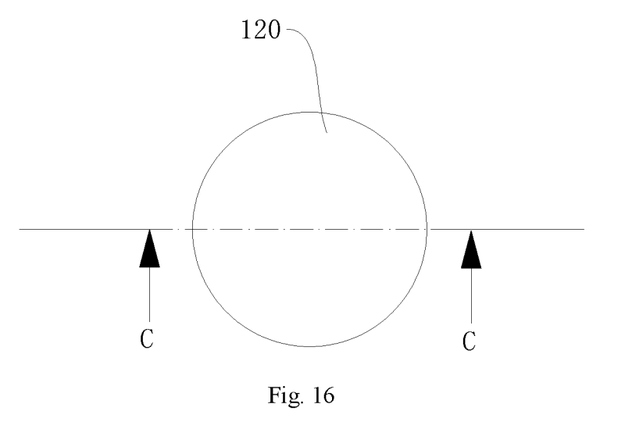
FIG. 16 shows a structural schematic view of a nail body of an end cover assembly according to the embodiments of the present application.
Figure 17:
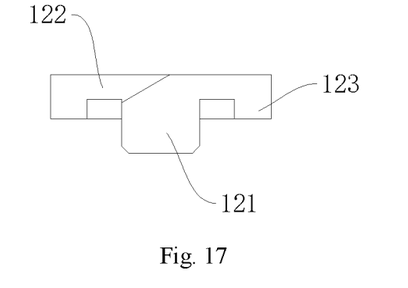
FIG. 17 shows a cross-sectional view at a line C-C in FIG. 16.

In another embodiment, referring to FIG. 10 to FIG. 12 together, the cross section of the annular wall portion 131 is in a shape of rectangle, so that the sealing member 130 is connected to the fixing portion 112 and/or the nail body 120 by means of face-to-face contact. By the face-to-face contact between the sealing member 130 and the fixing portion 112 and/or the nail body 120, a contact area between the sealing member 130 and the fixing portion 112 and/or the nail body 120 can be increased, and the sealing performance of the end cover assembly 100 can be improved.

When the sealing member 130 includes the first sealing member 130a and the second sealing member 130b, the shape of the cross-section of the first sealing member 130a and the shape of the cross-sectional of the second sealing member 130b may be the same, that is, each of the cross-sections of the first sealing member 130a and the second sealing member 130b can be in the shape of circle or rectangle. Or the shape of the cross-section of the first sealing member 130a and the shape of the cross-sectional of the second sealing member 130b may be different, that is, one of the cross sections of the first sealing member 130a and the second sealing member 130b is in the shape of circle, and the other is in the shape of rectangle.

There are many ways to arrange the material of the sealing member 130. In some embodiments, the material of the sealing member 130 may include at least one of rubber and foam, as long as the sealing member 130 has some elasticity such that the nail body 120 can be in interference fit with the fixing portion 112 through the sealing member 130.

Referring to FIG. 13 to FIG. 19 together, in some embodiments, the end cover assembly 100 further includes a locking member 140. The locking member 140 has an annular structure and is configured to lock outside the end cover plate 110, so that the nail body 120 can be pressed against and engaged with the fixing portion 112.

In these embodiments, by arranging the locking member 140, a force can be exerted from the outside of the nail body 120 to the nail body 120 and the fixing portion 112 to ensure the tight engagement of the nail body 120 and the fixing portion 112.

Figure 18:
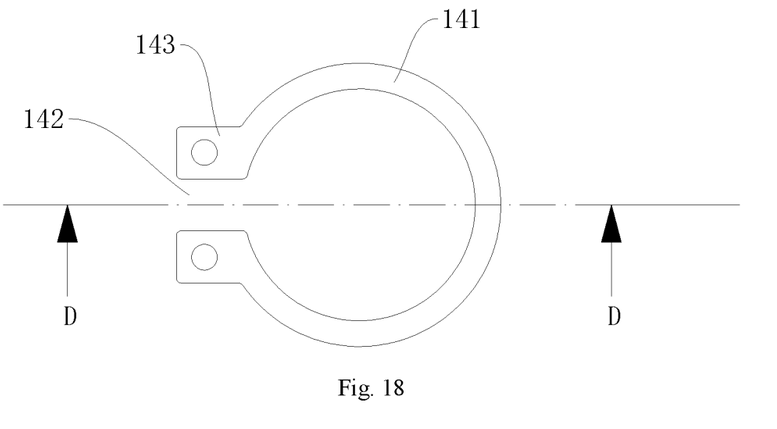
FIG. 18 shows a structural schematic view of a locking member of an end cover assembly according to the embodiments of the present application.
Figure 19:
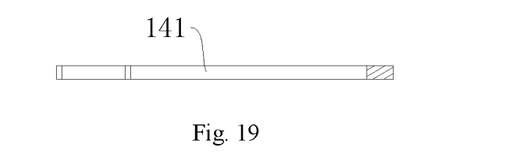
FIG. 19 shows a cross-sectional view at a line D-D in FIG. 18.

There are many ways to arrange the locking member 140. In some embodiments, the locking member 140 has a wall portion 141 and a hollow space enclosed by the wall portion 141. The size of the hollow space is adjustable, so that the locking member 140 can lock the nail body 120 and the fixing portion 112.

For example, the wall portion 141 is elastic. The nail body 120 and the fixing portion 112 can be locked by the elastic deformation of the wall portion 141.

Or a notch 142 communicating with the hollow space is formed in the wall portion 141, so that the locking member 140 is not in the shape of a closed annular, and the nail body 120 and the fixing portion 112 can be locked by means of adjusting a size of the notch 142.

In some embodiments, the wall portion 141 includes connecting portions 143 at two ends of the notch 142, each of the connecting portions 143 includes a penetrating hole therethrough, and two penetrating holes at the two ends of the notch 142 can be connected to each other through an intermediate connecting member.

In some embodiments, the end cover assembly 100 further includes a soluble glue, which is arranged at the end cover plate 110 and used to connect the nail body 120 and the end cover plate 110. The soluble glue covering the nail body 120 can further ensure the stability of the relative position between the nail body 120 and the end cover plate 110. The soluble glue can be made of, for example, a fusible material. When a secondary liquid injection is required, a dissolution operation can be performed to the soluble glue, so that the soluble glue can be deformed and melted, thereby facilitating the removal of the nail body 120 from the through hole 111.

Figure 20:
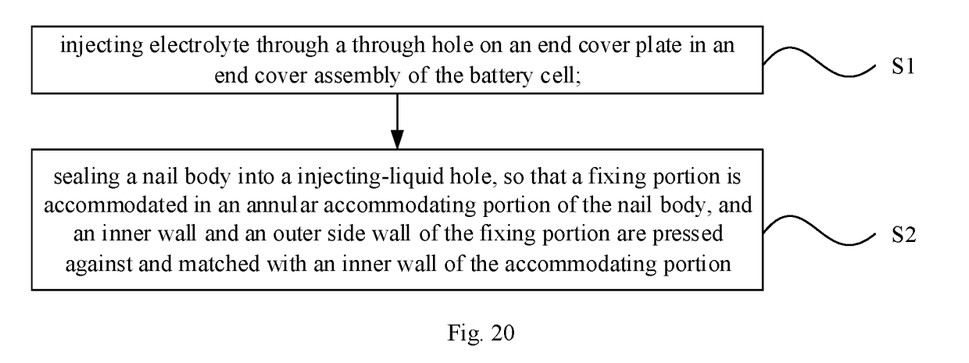
FIG. 20 shows a flowchart of a liquid injection method to a battery cell according to an embodiment of the present application.

Referring to FIG. 20, FIG. 20 shows a flowchart of a liquid injection method for the battery cell according to another embodiment of the present application. The battery cell 10 may be the battery cell 10 according to any one of the above-mentioned embodiments. The liquid injection method to the battery cell includes step S1: injecting electrolyte through the through hole on the end cover plate in the end cover assembly of the battery cell;

step S2: sealing the nail body into the through hole, so that the fixing portion can be accommodated in the annular accommodating portion of the nail body, and the inner wall and the outer side wall of the fixing portion are pressed against and engaged with the inner wall of the accommodating portion.

In these embodiments, the electrolyte is injected into the battery cell 10 through the through hole 111, and then the nail body 120 is sealed in the through hole 111, so that the inner wall and the outer side wall of the fixing portion are pressed against and engaged with the inner walls of the accommodating portion. The annular accommodating portion can provide the position limitations in two directions to the fixing portion 112, so that the force exerted to the fixing portion 112 is balanced. In this way, not only can the fixing portion 112 be prevented from obliquely deforming, but also the contact area between the nail body 120 and the fixing portion 112 can be increased, and the sealing effect can be improved.

In other embodiments, when the battery cell 10 has been used for a long time and the capacity of the electrolyte is reduced, the liquid injection method further includes: when the battery cell 10 is used for a long time and the capacity of the electrolyte is reduced, the liquid injection method further includes: unplugging the nail body 120 out of the through hole 111, injecting the electrolyte through the through hole 111, and re-sealing the nail body 120 into the through hole 111, so as to realize the secondary liquid injection of the battery cell 10.

The present application can be implemented in other specific forms without departing from its gist and essential characteristics. For example, the algorithm described in the specific embodiment can be modified, and the system architecture does not deviate from the basic gist of the application. Therefore, the current embodiment is considered to be exemplary rather than limiting in all respects. The scope of the present application is defined by the appended claims rather than the above description. In addition, all changes that fall within the meaning of the claims and the scope of equivalents are thus included in the scope of the present application.

What is claimed is:

1. An end cover assembly for a battery cell, comprising an end cover plate, comprising a through hole for injecting electrolyte and a fixing portion arranged around the through hole;
a nail body, comprising an accommodating portion for receiving the fixing portion, wherein the accommodating portion is in a shape of annular and comprises two inner walls arranged to be spaced apart from each other in a radial direction of the accommodating portion, an inner wall and an outer wall of the fixing portion are respectively pressed against and engaged with the two inner walls of the accommodating portion to seal the through hole;
wherein the end cover assembly further comprises a sealing member arranged between the nail body and the fixing portion so that the nail body is pressed against and engaged with the fixing portion;
the nail body comprises a column body for sealing the through hole and a cover cap connected to an end of the column body, the cover cap comprises a convex portion arranged around the column body;
the sealing member comprises a first sealing member, arranged to be sleeved between the column body and the inner wall of the fixing portion, and a first accommodating groove is arranged in the inner wall of the fixing portion and/or the column body to locate the first sealing member in the first accommodating groove; and
the sealing member further comprises a second sealing member, arranged to be sleeved between the outer wall of the fixing portion and the convex portion, and a second accommodating groove is arranged in the outer wall of the fixing portion and/or the convex portion to locate the second sealing member in the second accommodating groove.

2. The end cover assembly according to claim 1, wherein the convex portion and the column body enclose to form the accommodating portion, the column body is pressed against and engaged with the inner wall of the fixing portion, and the convex portion is pressed against and engaged with the outer wall of the fixing portion.

3. The end cover assembly according to claim 1, wherein the sealing member comprises an annular wall portion;
a cross section of the annular wall portion is in a shape of circle; or
a cross section of the annular wall portion is in a shape of rectangle, so that the sealing member is arranged to be in face-to-face contact with the fixing portion and/or the nail body.

4. The end cover assembly according to claim 2, further comprising a locking member that has an annular structure and is configured to sleeve and lock outside the cover cap, so that the nail body is pressed against and engaged with the fixing portion.

5. The end cover assembly according to claim 4, wherein the locking member comprises a wall portion and a hollow space enclosed by the wall, and a size of the hollow space is adjustable.

6. The end cover assembly according to claim 5, wherein the wall portion is elastic; or
a notch communicating with the hollow space is formed in the wall portion, so as to lock the nail body and the fixing portion by means of adjusting a size of the notch.

7. The end cover assembly according to claim 6, wherein the notch communicating with the hollow space is formed in the wall portion, the wall portion comprises connecting portions at two ends of the notch, each of the connecting portions comprises a penetrating hole therethrough, and two penetrating holes at the two ends of the notch can be connected to each other through an intermediate connecting member.

8. The end cover assembly according to claim 1, wherein the fixing portion is arranged to protrude from a surface of the end cover plate; or
a surface of the end cover plate is recessed to form a sinking platform, and the fixing portion is connected to a bottom face of the sinking platform.

9. A battery cell, comprising
a case, comprising an opening; and
the end cover assembly according to claim 1 for sealing and closing the opening.

10. The battery cell according to claim 9, wherein the convex portion and the column body enclose to form the accommodating portion, the column body is pressed against and engaged with the inner wall of the fixing portion, and the convex portion is pressed against and engaged with the outer wall of the fixing portion.

11. The battery cell according to claim 9, wherein the sealing member comprises an annular wall portion;
a cross section of the annular wall portion is in a shape of circle; or
a cross section of the annular wall portion is in a shape of rectangle, so that the sealing member is arranged to be in face-to-face contact with the fixing portion and/or the nail body.

12. A battery pack, comprising
the battery cell according to claim 9; and
a housing, configured to receive the battery cell.

13. Apparatus comprising the battery cell according to claim 9 for supplying electrical power; and
a housing, configured to receive the battery cell.

* * * * *